US012739052B2

(12) United States Patent
Yu et al.

(10) Patent No.: US 12,739,052 B2
(45) Date of Patent: Sep. 15, 2026

(54) INFORMATION TRANSMISSION METHOD AND APPARATUS

(71) Applicant: HUAWEI TECHNOLOGIES CO., LTD., Shenzhen (CN)

(72) Inventors: Tianhang Yu, Hangzhou (CN); Jiajie Tong, Hangzhou (CN); Gongzheng Zhang, Hangzhou (CN); Rong Li, Boulogne Billancourt (FR); Jun Wang, Hangzhou (CN); Wen Tong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 360 days.

(21) Appl. No.: 18/519,440

(22) Filed: Nov. 27, 2023

(65) Prior Publication Data

US 2024/0097816 A1 Mar. 21, 2024

Related U.S. Application Data

(63) Continuation of application No. PCT/CN2022/094058, filed on May 20, 2022.

(30) Foreign Application Priority Data

Jun. 4, 2021 (CN) ........................ 202110625092.2

(51) Int. Cl.
*H04L 1/00* (2006.01)

(52) U.S. Cl.
CPC .................................. *H04L 1/0003* (2013.01)

(58) Field of Classification Search
CPC ... H04L 1/0003; H04L 1/0009; H04L 1/0025; H04L 1/0033; H04L 1/0036; H04L 1/0057; Y02D 30/70
See application file for complete search history.

(56) References Cited

U.S. PATENT DOCUMENTS 8,280,368 B2 * 10/2012 Mantravadi ............ H04H 40/18 370/347
8,938,037 B1 * 1/2015 Fard .................... H04L 27/2272 375/345

(Continued)

FOREIGN PATENT DOCUMENTS

CA 2958756 C * 6/2019 ............. H04L 27/26
CA 3024192 C * 5/2021 ........ H04W 52/0216

(Continued)

OTHER PUBLICATIONS

ISO/IEC/IEEE 8802-11, "Information Technology, Telecommunications and Information Exchange Between Systems, Local and Metropolitan Area Networks, Specific Requirements, Part 11: Wireless LAN Medium Access Control (MAC) and Physical Layer (PHY) Specifications, Amendment 3: Enhancements for Very High Throughput in the 60 GHZ Band (adoption of IEEE Std 802.11ad-2012)", International Standard, IEEE, Mar. 15, 2014, 634 pages.

(Continued)

*Primary Examiner* — Sujoy K Kundu
*Assistant Examiner* — Vladislav Y Agureyev
(74) *Attorney, Agent, or Firm* — Maier & Maier, PLLC

(57) ABSTRACT

An information transmission method and an apparatus. The information transmission method includes: a receive end sends first indication information, where the first indication information indicates a target receiving mode of the receive end, and the target receiving mode is one of a plurality of receiving modes. The receive end receives service information based on the target receiving mode. The receive end performs decoding processing on the service information based on the target receiving mode. In this way, power consumption can be further reduced, and information transmission of a plurality of service types can be supported, (Continued)

thereby improving information transmission flexibility and user experience.

17 Claims, 12 Drawing Sheets

(56) References Cited

U.S. PATENT DOCUMENTS 9,667,460 B2* 5/2017 Zhang ............... H04L 27/26136
9,756,659 B2* 9/2017 Seok ................ H04W 52/0235
12,119,939 B2* 10/2024 Schelstraete ......... H04B 7/0632
2007/0173203 A1* 7/2007 Fei ...................... H04L 27/2657 455/69
2010/0061400 A1* 3/2010 Hong .................... H04L 1/0072 714/752
2011/0080972 A1* 4/2011 Xi ......................... H04L 1/0625 375/267
2012/0236802 A1* 9/2012 Gong .................... H04L 5/0094 370/329
2014/0314168 A1 10/2014 Xu et al.
2015/0194975 A1* 7/2015 Miaille ................... H03M 3/44 324/76.39
2015/0280862 A1* 10/2015 Teplitsky ................. H04B 1/30 375/319
2015/0296454 A1* 10/2015 Lee .................. H04W 52/0209 370/311
2016/0119762 A1* 4/2016 Zhu ..................... H04B 7/0452 370/312
2016/0286011 A1* 9/2016 Kasher .................. H04L 1/0083
2016/0309457 A1* 10/2016 Eitan .................... H04B 7/0426
2016/0323058 A1* 11/2016 Cordeiro ............... H04L 1/0009
2016/0330738 A1* 11/2016 Eitan ..................... H04L 1/0084
2017/0013507 A1* 1/2017 Lee ......................... H04W 4/80
2017/0086141 A1* 3/2017 Gal ......................... H04L 43/16
2017/0163331 A1* 6/2017 Breiling ............. H04B 7/15592
2017/0188182 A1* 6/2017 Jin .......................... H04L 27/12
2017/0250848 A1* 8/2017 Lee ....................... H04L 1/0009
2017/0303280 A1* 10/2017 Chun .................... H04L 5/0094
2018/0006866 A1* 1/2018 Trainin ............... H04W 74/002
2018/0020374 A1* 1/2018 Kasher .................. H04W 28/06
2018/0192449 A1* 7/2018 Mueck .................. H04W 48/20
2019/0159127 A1* 5/2019 Son ................... H04W 52/0216
2019/0165885 A1* 5/2019 Murakami ......... H03M 13/1102
2019/0238257 A1* 8/2019 Hosseini ............... H04L 1/0016
2019/0268776 A1* 8/2019 Eitan ................. H04W 74/0816
2019/0305996 A1* 10/2019 Handte ................. H04L 1/0009
2020/0112391 A1 4/2020 Yang et al.
2020/0229206 A1* 7/2020 Badic ................... G05D 1/6445
2020/0235867 A1* 7/2020 Choi ..................... H04L 1/1854
2020/0281014 A1* 9/2020 Mu ....................... H04L 5/0048
2020/0287759 A1* 9/2020 Van Nee ............. H04L 27/2613
2020/0322078 A1* 10/2020 Maltsev ................. H03M 13/11
2021/0167996 A1* 6/2021 Ratnam ................ H04B 7/0617
2021/0235462 A1* 7/2021 Gutman ................ H04L 1/0035
2022/0069860 A1* 3/2022 Park ...................... H04L 5/1461
2022/0312330 A1* 9/2022 Chakraborty ..... H04W 52/0245
2022/0393913 A1* 12/2022 Orhan ................. H04L 27/2675
2023/0064231 A1* 3/2023 Haghighat ............ H04L 5/0053
2023/0113600 A1* 4/2023 Luo ....................... H04L 1/0052 375/267

FOREIGN PATENT DOCUMENTS

CN 110324884 A 10/2019
CN 111901016 A 11/2020
EP 3927068 A1 * 12/2021 ........... H04L 5/0096
EP 4094386 B1 * 4/2025 ............ H04W 72/23
WO WO-2019195426 A1 * 10/2019 ......... H04L 25/0224

OTHER PUBLICATIONS

P802.11ay™/D5.0, "Draft Standard for Information Technology, Telecommunications and Information Exchange, Between Systems, Local and Metropolitan Area, Networks, Specific Requirements, Part 11: Wireless, LAN Medium Access Control (MAC) and Physical Layer (PHY) Specifications, Amendment 2: Enhanced throughput for operation in license-exempt bands above 45 GHZ", Working Group of the LAN/MAN Standards Committee of the IEEE Computer Society, The Institute of Electrical and Electronics Engineers, Inc., IEEE, Oct. 2019, 790 pages.

* cited by examiner

INFORMATION TRANSMISSION METHOD AND APPARATUS

CROSS-REFERENCE TO RELATED APPLICATIONS

This application is a continuation of International Patent Application No. PCT/CN2022/094058, filed on May 20, 2022, which claims priority to Chinese Patent Application No. 202110625092.2, filed on Jun. 4, 2021. The disclosures of the aforementioned applications are hereby incorporated by reference in their entireties.

TECHNICAL FIELD

The embodiments relate to the communication field and to an information transmission method and an apparatus.

BACKGROUND

With continuous evolution of wireless network forms and application scenarios, networks need to consider services that have different requirements for both rates and power consumption. For example, in a smart home scenario, a network needs to support services with a peak transmission rate of up to 10 Gbps, such as a high-definition video service, a virtual reality (VR) service, and the like, but also needs to support devices with extremely low power consumption requirements, such as a wireless headset, a watch, and the like. High-rate services require higher frequency bands, higher bandwidth, and more antennas to implement ultra-high-rate data transmission, and high-frequency short-distance communication is applicable to this scenario. However, because power consumption of an analog-to-digital converter (ADC) increases exponentially with improvement of sampling precision of the analog-to-digital converter, it is difficult to implement a high-speed and high-precision ADC, especially for an ultra-low power consumption device. Therefore, a low-precision ADC and even a single-bit ADC are applicable to an ultra-low power consumption scenario. However, a system design of a high-precision receiver is different from that of a low-precision receiver.

The 802.11 ay/ad standard considers compatibility requirements for high-rate services and low power consumption services, uses an orthogonal frequency division multiplexing (OFDM) waveform and a single carrier (SC) waveform, and uses a low-density parity-check (LDPC) code and a Reed-Solomon (RS) code for channel encoding. When a service requirement is a high rate, an OFDM waveform and an LDPC code are used to ensure high-rate transmission. When a service requirement is low power consumption, an SC waveform and an RS code are used. However, 802.11 ay/ad can support low power consumption services mainly by reducing demodulation and decoding power consumption. How to further reduce power consumption and support information transmission of a plurality of service types is an urgent problem to be resolved.

SUMMARY

The embodiments provide an information transmission method and an apparatus so that power consumption can be further reduced, and information transmission of a plurality of service types can be supported, thereby improving information transmission flexibility.

According to a first aspect, an information transmission method is provided. The method may include: a receive end sends first indication information, where the first indication information indicates a target receiving mode of the receive end, and the target receiving mode is one of a plurality of receiving modes; the receive end receives service information based on the target receiving mode; and the receive end performs decoding processing on the service information based on the target receiving mode.

In the method, the receive end reports the receiving mode and decodes the service information based on the target receiving mode, so that a problem that encoding processing of a transmit end does not match the receiving mode of the receive end can be avoided, power consumption is further reduced, and information transmission of a plurality of service types is supported, thereby improving information transmission flexibility and user experience.

It should be understood that a plurality of receiving modes supported by the receive end correspond to different decoding processing solutions.

It should be understood that the target receiving mode may be reported by the receive end to the transmit end, or may be indicated by the transmit end to the receive end. This is not limited.

It should be further understood that the plurality of receiving modes may mean that the receive end is compatible with the plurality of receiving modes simultaneously, or may mean that a plurality of receive ends in a system support the plurality of receiving modes. This is not limited.

With reference to the first aspect, in some implementations of the first aspect, the receive end receives second indication information, where the second indication information indicates a first modulation and coding scheme (MCS), and the first MCS is determined based on the target receiving mode; and the receive end performs demodulation processing on the service information based on the first MCS.

It should be understood that the first MCS may be determined by the transmit end based on the target receiving mode, and indicated to the receive end. Different MCSs correspond to different receiving modes.

With reference to the first aspect, in some implementations of the first aspect, the plurality of receiving modes include a first receiving mode and a second receiving mode, and when the target receiving mode is the first receiving mode, the receive end receives a first frame, where the first frame includes a first field and a second field, the first field carries the service information, and the second field includes a channel estimation pilot sequence; or when the target receiving mode is the second receiving mode, the receive end receives a second frame, where the second frame includes a third field and a fourth field, the third field carries the service information, and the fourth field includes a phase estimation pilot sequence.

It should be understood that the second field may be determined based on the target receiving mode. For example, when the receiving mode is Mode A (the first receiving mode), the pilot sequence in the second field uses a pilot used for channel estimation, such as a Golay sequence, a Zad-off Chu sequence, or the like. When the receiving mode is Mode B or Mode C, such as the second receiving mode, a pilot sequence in an optional field needs to support phase estimation in a single-bit ADC receiving procedure. Therefore, a pilot sequence phase needs to have a feature of being evenly distributed in $[-\pi, \pi]$, and may be obtained by multiplying the pilot sequence used for channel estimation by a known evenly distributed phase sequence.

With reference to the first aspect, in some implementations of the first aspect, the plurality of receiving modes include the first receiving mode and the second receiving mode, the first receiving mode is for receiving the service information through a multi-bit analog-to-digital converter ADC, and the second receiving mode is for receiving the service information through a single-bit ADC.

It should be understood that the first receiving mode may include Mode A, and the second receiving mode may include Mode B and/or Mode C.

With reference to the first aspect, in some implementations of the first aspect, the plurality of receiving modes include a third receiving mode, a fourth receiving mode, and a fifth receiving mode, decoding processing corresponding to the third receiving mode includes frequency offset estimation/compensation and equalization, decoding processing corresponding to the fourth receiving mode includes analog phase compensation and equalization/hard decision, and decoding processing corresponding to the fifth receiving mode includes analog phase compensation.

It should be understood that the third receiving mode may be Mode A, the fourth receiving mode may be Mode B, and the fifth receiving mode may be Mode C.

With reference to the first aspect, in some implementations of the first aspect, the receive end receives third indication information, where the third indication information indicates a first waveform, and the first waveform is determined based on the target receiving mode; and the receive end performs demodulation processing on the service information based on the first waveform.

With reference to the first aspect, in some implementations of the first aspect, the decoding processing further includes synchronization, channel estimation and/or phase estimation, demapping, and channel decoding.

According to a second aspect, an information transmission method is provided. The method may include: A transmit end receives first indication information, where the first indication information indicates a target receiving mode of a receive end, and the target receiving mode is one of a plurality of receiving modes; the transmit end performs encoding processing on service information based on the target receiving mode; and the transmit end sends the service information.

With reference to the second aspect, in some implementations of the second aspect, the transmit end performs encoding processing on the service information based on a first modulation and coding scheme (MCS), where the first MCS is determined based on the target receiving mode; and the transmit end sends second indication information, where the second indication information indicates the first MCS.

With reference to the second aspect, in some implementations of the second aspect, the plurality of receiving modes include a first receiving mode and a second receiving mode, and

- when the target receiving mode is the first receiving mode, the transmit end sends a first frame, where the first frame includes a first field and a second field, the first field carries the service information, and the second field includes a channel estimation pilot sequence; or
- when the target receiving mode is the second receiving mode, the transmit end sends a second frame, where the second frame includes a third field and a fourth field, the third field carries the service information, and the fourth field includes a phase estimation pilot sequence.

With reference to the second aspect, in some implementations of the second aspect, the plurality of receiving modes include the first receiving mode and the second receiving mode, and encoding processing corresponding to the second receiving mode includes frequency offset precompensation.

With reference to the second aspect, in some implementations of the second aspect, the transmit end performs modulation and shaping processing on the service information in a first waveform based on the target receiving mode; and the transmit end sends third indication information, where the third indication information indicates the first waveform.

With reference to the second aspect, in some implementations of the second aspect, the encoding processing further includes channel encoding, mapping, and pre-encoding.

According to a third aspect, a communication apparatus is provided. The communication apparatus may include a transceiver unit and a processing unit. The transceiver unit is configured to send first indication information, where the first indication information indicates a target receiving mode of a receive end, and the target receiving mode is one of a plurality of receiving modes; and the transceiver unit is further configured to receive service information; and the processing unit is configured to perform decoding processing on the service information based on the target receiving mode.

With reference to the third aspect, in some implementations of the third aspect, the transceiver unit is further configured to receive second indication information, where the second indication information indicates a first modulation and coding scheme (MCS), and the first MCS is determined based on the target receiving mode; and the processing unit is configured to perform demodulation processing on the service information based on the first MCS.

With reference to the third aspect, in some implementations of the third aspect, the plurality of receiving modes include a first receiving mode and a second receiving mode, and

- when the target receiving mode is the first receiving mode, the transceiver unit is configured to receive a first frame, where the first frame includes a first field and a second field, the first field carries the service information, and the second field includes a channel estimation pilot sequence; or
- when the target receiving mode is the second receiving mode, the transceiver unit is configured to receive a second frame, where the second frame includes a third field and a fourth field, the third field carries the service information, and the fourth field includes a phase estimation pilot sequence.

With reference to the third aspect, in some implementations of the third aspect, the plurality of receiving modes include the first receiving mode and the second receiving mode, the first receiving mode is for receiving the service information through a multi-bit analog-to-digital converter ADC, and the second receiving mode is for receiving the service information through a single-bit ADC.

With reference to the third aspect, in some implementations of the third aspect, the plurality of receiving modes include a third receiving mode, a fourth receiving mode, and a fifth receiving mode, decoding processing corresponding to the third receiving mode includes frequency offset estimation/compensation and equalization, decoding processing corresponding to the fourth receiving mode includes analog phase compensation and equalization/hard decision, and decoding processing corresponding to the fifth receiving mode includes analog phase compensation.

With reference to the third aspect, in some implementations of the third aspect, the transceiver unit is further configured to receive third indication information, where the third indication information indicates a first waveform, and the first waveform is determined based on the target receiving mode; and the processing unit is further configured to perform demodulation processing on the service information based on the first waveform.

With reference to the third aspect, in some implementations of the third aspect, the processing unit is further configured to perform synchronization, channel estimation and/or phase estimation, demapping, and channel decoding.

According to a fourth aspect, a communication apparatus is provided. The communication apparatus may include a processing unit and a transceiver unit. The transceiver unit is configured to receive first indication information, where the first indication information indicates a target receiving mode of a receive end, and the target receiving mode is one of a plurality of receiving modes; the processing unit is configured to perform encoding processing on service information based on the target receiving mode; and the transceiver unit is further configured to send the service information.

With reference to the fourth aspect, in some implementations of the fourth aspect, the processing unit is further configured to perform encoding processing on the service information based on a first modulation and coding scheme MCS, where the first MCS is determined based on the target receiving mode; and the transceiver unit is further configured to send second indication information, where the second indication information indicates the first MCS.

With reference to the fourth aspect, in some implementations of the fourth aspect, the plurality of receiving modes include a first receiving mode and a second receiving mode, and when the target receiving mode is the first receiving mode, the transceiver unit sends a first frame, where the first frame includes a first field and a second field, the first field carries the service information, and the second field includes a channel estimation pilot sequence; or when the target receiving mode is the second receiving mode, the transceiver unit sends a second frame, where the second frame includes a third field and a fourth field, the third field carries the service information, and the fourth field includes a phase estimation pilot sequence.

With reference to the fourth aspect, in some implementations of the fourth aspect, the plurality of receiving modes include the first receiving mode and the second receiving mode, and encoding processing corresponding to the second receiving mode includes frequency offset precompensation.

With reference to the fourth aspect, in some implementations of the fourth aspect, the processing unit is further configured to perform modulation and shaping processing on the service information in a first waveform based on the target receiving mode; and the transceiver unit is further configured to send third indication information, where the third indication information indicates the first waveform.

With reference to the fourth aspect, in some implementations of the fourth aspect, the processing unit is further configured to perform channel encoding, mapping, pre-encoding, and shaping.

It should be understood that extensions to, limitations on, explanations for, and descriptions of corresponding content in the first aspect are also applicable to same content in the second aspect, the third aspect, and the fourth aspect.

According to a fifth aspect, a communication apparatus is provided. The communication apparatus includes at least one processor. The at least one processor is coupled to at least one memory, and may be configured to execute instructions in the memory, to implement the method according to any one of the first aspect or the possible implementations of the first aspect. Optionally, the communication apparatus further includes the at least one memory. Optionally, the communication apparatus further includes a communication interface, the at least one processor is coupled to the communication interface, and the communication interface is configured to input and/or output information. The information includes at least one of instructions and data.

In an implementation, the communication apparatus is a receive end, and the communication interface may be a transceiver or an input/output interface.

In another implementation, the communication apparatus is a chip or a chip system. When the communication apparatus is the chip or the chip system, the communication interface may be an input/output interface, or may be an input/output interface, an interface circuit, an output circuit, an input circuit, a pin, a related circuit, or the like on the chip or the chip system. The processor may alternatively be embodied as a processing circuit or a logic circuit.

In another implementation, the communication apparatus is a chip or a chip system configured at a receive end.

Optionally, the transceiver may be a transceiver circuit. Optionally, the input/output interface may be an input/output circuit.

According to a sixth aspect, a communication apparatus is provided. The communication apparatus includes at least one processor. The at least one processor is coupled to at least one memory, and may be configured to execute instructions in the at least one memory, to implement the method according to any one of the second aspect or the possible implementations of the second aspect. Optionally, the communication apparatus further includes the at least one memory. Optionally, the communication apparatus further includes a communication interface, the at least one processor is coupled to the communication interface, and the communication interface is configured to input and/or output information.

In an implementation, the communication apparatus is a transmit end, and the communication interface may be a transceiver or an input/output interface.

In another implementation, the communication apparatus is a chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

In another implementation, the communication apparatus is a chip or a chip system configured at a transmit end.

Optionally, the transceiver may be a transceiver circuit. Optionally, the input/output interface may be an input/output circuit.

According to a seventh aspect, a chip is provided. The chip includes at least one processor and a communication interface. The communication interface is configured to receive a signal input to the chip or output a signal from the chip. The processor communicates with the communication interface, and is configured to implement the method according to any one of the first aspect or the possible implementations of the first aspect through a logic circuit or code instructions, or is configured to implement the method according to any one of the second aspect or the possible implementations of the second aspect.

According to an eighth aspect, a communication apparatus is provided. The communication apparatus includes: at least one memory, configured to store computer instructions; and at least one processor, configured to execute the computer instructions stored in the at least one memory, so that the communication apparatus performs the method according to any one of the first aspect or the possible implementations of the first aspect, or the communication apparatus performs the method according to any one of the second aspect or the possible implementations of the second aspect.

According to a ninth aspect, a computer-readable storage medium is provided. The computer-readable storage medium stores a computer program. When the computer program is executed by a communication apparatus, the communication apparatus is enabled to implement the method according to any one of the first aspect or the possible implementations of the first aspect.

According to a tenth aspect, a non-transitory computer-readable storage medium is provided. The non-transitory computer-readable storage medium stores a computer program. When the computer program is executed by a communication apparatus, the communication apparatus is enabled to implement the method according to any one of the second aspect or the possible implementations of the second aspect.

According to an eleventh aspect, a computer program product is provided. The computer program product includes a computer program (which may also be referred to as code or instructions). When the computer program is run, a computer is enabled to perform the method according to any one of the first aspect or the possible implementations of the first aspect.

According to a twelfth aspect, a computer program product is provided. The computer program product includes a computer program (which may also be referred to as code or instructions). When the computer program is run, a computer is enabled to perform the method according to any one of the second aspect or the possible implementations of the second aspect.

According to a thirteenth aspect, a communication system is provided. The communication system includes the communication apparatus according to the third aspect and the communication apparatus according to the fourth aspect.

DETAILED DESCRIPTION OF EMBODIMENTS

Figure 1:
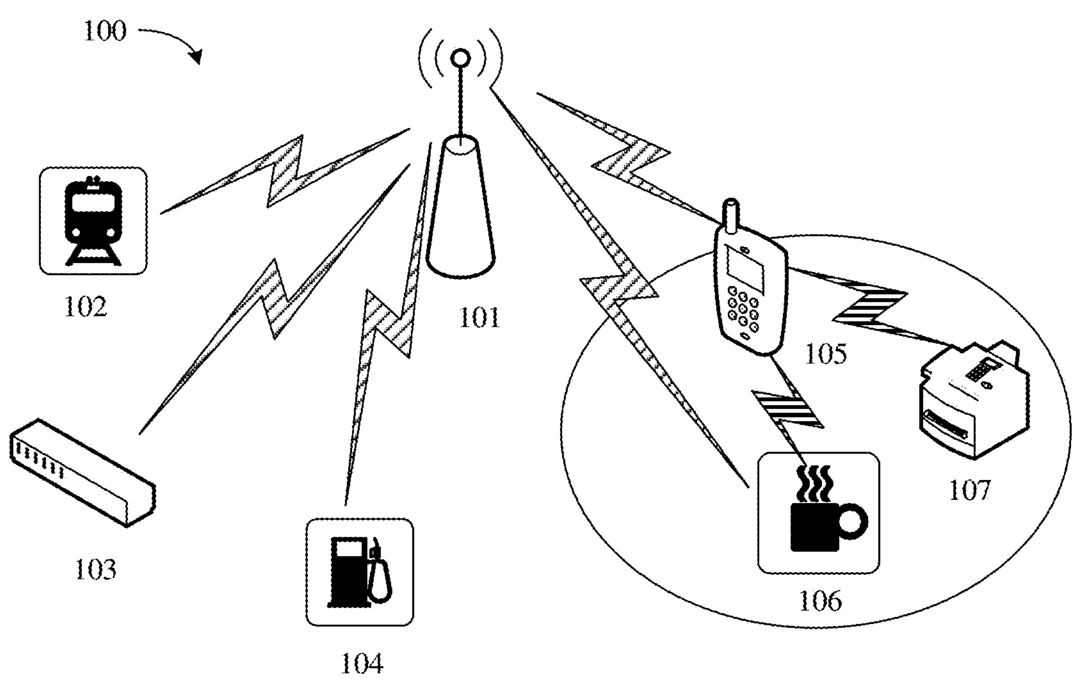
FIG. 1 is a schematic diagram of a communication system to which an embodiment is applicable.

The following describes solutions of the embodiments with reference to accompanying drawings.

The solutions in embodiments may be applied to various communication systems, for example, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WIMAX) communication system, and a future 5th generation 5G system or a new radio (NR) system, or may be extended to a similar wireless communication system, for example, a wireless fidelity (Wi-Fi) system, a 3rd generation partnership project (3GPP) related cellular system, and the like.

Generally, a conventional communication system supports a limited quantity of connections, and is easy for implementation. However, with development of communication technologies, a mobile communication system not only supports conventional communication, but also supports, for example, device to device (D2D) communication, machine to machine (M2M) communication, machine-type communication (MTC), vehicle to everything (vV2X) communication, vehicle to vehicle (vV2V) communication, vehicle to infrastructure (V2I) communication, vehicle to pedestrian (V2P) communication, and vehicle to network (V2N) communication.

It should be further understood that the solutions in embodiments may be further applied to various communication systems based on a non-orthogonal multiple access technology, for example, a sparse code multiple access (SCMA) system, and SCMA may also be referred to as another name in the communication field. Further, the solutions in embodiments may be applied to a multi-carrier transmission system that uses the non-orthogonal multiple access technology, for example, an OFDM system, a filter bank multi-carrier (FBMC) system, a generalized frequency division multiplexing (GFDM) system, a filtered orthogonal frequency division multiplexing (F-OFDM) system, and the like that uses the non-orthogonal multiple access technology.

The solutions provided in the embodiments may alternatively be applied to a future communication system, for example, a 6th generation mobile communication system, and the like. This is not limited.

In embodiments, a terminal device may be referred to as user equipment (UE), an access terminal, a subscriber unit, a subscriber station, a mobile station, a mobile console, a remote station, a remote terminal, a mobile device, a user terminal, a terminal, a wireless communication device, a user agent or a user apparatus, a soft terminal, or the like, and includes various handheld devices having a wireless communication function, vehicle-mounted devices, wearable devices, computing devices, or other processing devices connected to a wireless modem. The terminal may be a mobile station (MS), a subscriber unit, a cellular phone, a smartphone, a wireless data card, a personal digital assistant (PDA) computer, a tablet computer, a wireless modem, a handset, a laptop computer, a machine-type communication (MTC) terminal, or the like.

The terminal device in embodiments may also be a mobile phone, a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, for example, a smartphone, a smart television, VR glasses, a headset, or a watch, a cellular phone, a cordless phone, a session initiation protocol (SIP) phone, a wireless local loop (WLL) station, a PDA, a handheld terminal, a laptop computer, a cordless phone or a wireless local loop (WLL) station, a terminal device in a future 5G network, a terminal device in a future evolved public land mobile network (PLMN), or the like.

In addition, the terminal device may alternatively be a terminal device in an internet of things (IoT) system. IoT is an important component in development of future information technologies. A main feature of the IoT is to connect an object to a network by using a communication technology, to implement an intelligent network of human-machine interconnection and thing-thing interconnection. It should be understood that a specific form of the terminal device is not limited.

In addition, the terminal device may alternatively include a sensor such as an intelligent printer, a train detector, a gas station, or the like, and main functions of the terminal device include collecting data (for some terminal devices), receiving control information and downlink data from a network device, sending an electromagnetic wave, and transmitting uplink data to the network device.

In embodiments, the network device may be an apparatus that is deployed in a radio access network and that provides a wireless communication function for the terminal device, and may be a device configured to communicate with the terminal device or a chip of the device. The network device includes, but is not limited to: a radio network controller (RNC), a base station controller (BSC), a home base station (for example, a home evolved NodeB, or a home NodeB, HNB), a baseband unit (BBU), an access point (AP) in a wireless fidelity system, a radio relay node, a radio backhaul node, a transmission point (TP), a transmission reception point (TRP), or the like, or may be a gNB or a transmission point (a TRP or a TP) in a 5G (for example, NR) system, or one or a group (including a plurality of antenna panels) of antenna panels of a base station in a 5G system, or may be a network node that forms a gNB or a transmission point, such as a baseband unit BBU, a distributed unit (DU), or the like.

The network device in embodiments may include various forms of macro base stations, micro base stations (which are also referred to as small cells), relay stations, access points, and the like, or may be a base transceiver station (BTS) in a global system for mobile communications GSM system or a code division multiple access CDMA system, or may be a NodeB (NB) in a wideband code division multiple access WCDMA system, or may be an evolved NodeB (eNB or eNodeB) in an LTE system, or may be a radio controller in a cloud radio access network (CRAN) scenario. Alternatively, the network device may be a relay station, an access point, a wearable device, a vehicle-mounted device, a network device in a 5G or future network, a network device in a future evolved public land mobile network PLMN network, or the like.

In some network deployments, the network device may include a central unit (CU) and a DU. The network device may alternatively include a radio unit (RU), an active antenna unit (AAU). The CU implements some functions of the network device, for example, is responsible for processing a non-real-time protocol and service, and implements functions of a radio resource control (RRC) layer and a packet data convergence protocol (PDCP) layer. The DU implements some functions of the network device, for example, is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and an active antenna related function. Information at the RRC layer eventually becomes information at the PHY layer, or is converted from information at the PHY layer. Therefore, in this architecture, higher layer signaling (for example, RRC layer signaling) may also be considered as being sent by the DU or sent by the DU and the AAU. It may be understood that the network device may be a CU node, a DU node, or a device including a CU node and a DU node. In addition, the CU may be classified as a network device in an access network RAN, or the CU may be classified as a network device in a core network CN. This is not limited herein.

The network device provides a service for a cell. The terminal device communicates with the cell by using a transmission resource (for example, a frequency domain resource, a spectrum resource, or the like) allocated by the network device. The cell may belong to a macro base station (for example, a macro eNB, a macro gNB, or the like), or may belong to a base station corresponding to a small cell. The small cell herein may include a metro cell, a micro cell, a pico cell, a femto cell, and the like. These small cells are featured by small coverage and low transmit power, and are applicable to providing a high-rate data transmission service.

In embodiments, the network device and the terminal device include a radio resource control (RRC) signaling exchange module, a MAC signaling exchange module, and a PHY signaling exchange module. The RRC signaling exchange module may be a module used by the network device and the terminal device to send and receive RRC signaling. The MAC signaling exchange module may be a module used by the network device and the terminal device to send and receive media access control control element (MAC CE) signaling. The PHY signaling exchange module may be a module used by the network device and the terminal device to send and receive uplink control signaling or downlink control signaling, uplink data, or downlink data.

It should be understood that embodiments are applicable to an LTE system and a subsequent evolved system such as 5G or the like, or another wireless communication system that uses various radio access technologies, for example, a system that uses an access technology such as code division multiple access, frequency division multiple access, time division multiple access, orthogonal frequency division multiple access, single carrier frequency division multiple access, or the like.

To facilitate understanding of embodiments, the following first describes a communication system to which a method according to embodiments is applicable in detail with reference to FIG. 1. FIG. 1 is a schematic diagram of a communication system 100 to which a method according to an embodiment is applicable. As shown in the figure, the communication system 100 may include at least one network device, for example, a network device 101 in a 5G system shown in FIG. 1. The communication system 100 may further include at least one terminal device, for example, terminal devices 102 to 107 shown in FIG. 1. The terminal devices 102 to 107 may be mobile or fixed. The network device 101 may communicate with one or more of the terminal devices 102 to 107 through a radio link. Each network device may provide communication coverage for a particular geographic area, and may communicate with a terminal device located in the coverage. For example, the network device may send configuration information to the terminal device, and the terminal device may send uplink data to the network device based on the configuration information. For another example, the network device may send downlink data to the terminal device. Therefore, a communication system includes the network device 101 and the terminal devices 102 to 107 in FIG. 1.

Optionally, the terminal devices may directly communicate with each other. For example, direct communication between the terminal devices may be implemented using a D2D technology or the like. As shown in the figure, the terminal devices 105 and 106 may directly communicate with each other using the D2D technology, and the terminal devices 105 and 107 may directly communicate with each other using the D2D technology. The terminal device 106 and the terminal device 107 may communicate with the terminal device 105 separately or simultaneously.

The terminal devices 105 to 107 may alternatively communicate with the network device 101 separately. For example, direct communication with the network device 101 may be implemented. For example, the terminal devices 105 and 106 in the figure may directly communicate with the network device 101. Alternatively, indirect communication with the network device 101 may be implemented. For example, the terminal device 107 in the figure communicates with the network device 101 through the terminal device 105.

It should be understood that FIG. 1 shows one network device, a plurality of terminal devices, and communication links between communication devices. Optionally, the communication system 100 may include a plurality of network devices, and another quantity of terminal devices, for example, more or fewer terminal devices may be included in coverage of each network device. This is not limited.

A plurality of antennas may be configured for the foregoing communication devices, for example, the network device 101 and the terminal devices 102 to 107 in FIG. 1. The plurality of antennas may include at least one transmit antenna for sending a signal and at least one receive antenna for receiving a signal. In addition, each communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multiple-antenna technology.

Optionally, the wireless communication system 100 may further include other network entities such as a network controller or a mobility management entity. This embodiment is not limited thereto.

It should be further understood that FIG. 1 is only a simplified schematic diagram of an example for ease of understanding. The communication system 100 may further include another network device or another terminal device, which is not shown in FIG. 1.

It should be understood that a transmit end and a receive end are used as descriptions of two parties for information exchange. The transmit end may be the foregoing network device or the terminal device, and the receive end may be the foregoing network device or the terminal device. This is not limited.

For ease of understanding the solutions of the embodiments, related concepts are briefly explained.

1. Channel Encoding

Channel encoding is also referred to as error control encoding. Redundant information is added to original data at the transmit end. The redundant information is related to the original data. Then, the receive end detects and corrects errors generated in a transmission process based on the correlation, to prevent interference in the transmission process.

2. Analog-to-Digital Conversion

Analog-to-digital conversion is conversion from an analog signal to a digital signal. The analog signal is sampled and then quantized. The analog signal is a continuously changing value, and a quantized value is a discrete value. After the quantization is completed, a level is encoded, for example, one level corresponds to a group of binary numbers, and a process of converting the analog signal to the digital signal is completed. If a sampling rate and a quantization level are increased, a shape of the digital signal is closer to a waveform curve of the original analog signal, and this means that the analog signal can be better restored.

3. Modulation and Coding Scheme (MCS)

Coding is channel coding. Details are not described herein again. Modulation means that a signal source controls some characteristics of a carrier to facilitate transmission on a channel. The carrier includes information such as a frequency, a phase, an amplitude, and the like, and may be modulated for different characteristics. Modulation includes a process of symbol mapping and carrier modulation.

4. SC Modulation and OFDM Modulation

Single carrier modulation uses one signal carrier to transmit all data signals. OFDM modulation is a multi-carrier modulation scheme, and divides a carrier into a plurality of subcarriers with narrow bandwidth. These subcarriers are orthogonal to each other, and these subcarriers are encoded through fast Fourier transform.

A single carrier avoids a problem that a ratio of maximum instantaneous electric power to average electric power of a multi-carrier system is quite large when phases are the same. In this way, a more economical and efficient power amplifier may be used in the design, the technology is more mature, and the system is more stable. A single carrier system has much lower requirements on a frequency offset and phase noise than an OFDM system. For a burst point-to-multipoint communication system, the single carrier modulation scheme can simplify the design of frequency and time synchronization, and improve system stability. The OFDM system synchronously transmits payload through a plurality of subcarriers, and uses an error correction code. This has better suppression for signals with different delays and phases because the signals are received through a plurality of paths.

5. Frame Structure

In a frequency division duplex (FDD) mode, 10 subframes of each radio frame may be used for downlink transmission, or may be used for uplink transmission, and uplink transmission and downlink transmission are performed respectively in different frequency domains. In a half-duplex FDD mode, user equipment UE cannot send and receive data in a same subframe simultaneously. However, in a full-duplex FDD mode, the UE does not have this limitation, and can send and receive data in a same subframe simultaneously.

6. Oversampling

In a signal collection process, an ADC is used to discretize continuous analog signals. However, a quantity of bits of the ADC is limited, such as eight bits, 12 bits, 14 bits, and the like. Therefore, a resolution of the ADC is also limited, such as $V_{ref}/(2\^8)V$, $V_{ref}/(2\^128)V$, $V_{ref}/(2\^14)V$, and the like, where $V_{ref}$ is a reference voltage. In this case, if an oversampling technology is used, an effective quantity of bits of the ADC may be increased under a hardware condition of a fixed quantity of bits of the ADC, to improve a resolution of the ADC. In general, oversampling increases the effective quantity of bits by increasing a signal-to-noise ratio (SNR), and then improves the resolution of ADC. This is a method to reduce quantization noise of ADC.

7. Receiving Mode

In the embodiments, the receiving mode of the receive end is divided into three different types: a high-throughput mode, which is referred to as Mode A below; an ultra-low power consumption mode, which is referred to as Mode B; and an enhanced low power consumption mode, which is referred to as Mode C respectively. It should be understood that different receiving modes correspond to different service requirements, and different receiving modes correspond to different receiving solutions. For example, for a receiver (a computer, a high-definition television, and the like) that needs to support a high-throughput service, a multi-bit ADC may be used for receiving, and includes a high-precision ADC (≥4 bits) and a low-precision ADC (2 to 3 bits), a used waveform may be OFDM or an SC, and a mapping manner may be multiple quadrature amplitude modulation (MQAM) or multiple phase shift keying (MPSK). For a receiver (a watch, a wireless headset, and the like) that needs to support ultra-low power consumption, a single-bit ADC and non-oversampling may be used for receiving, a waveform may be an SC, and a mapping manner may be binary phase shift keying (BPSK) or quadrature phase shift keying (QPSK). For an enhanced low power consumption device (such as VR glasses and the like) that needs to support a high-throughput service on a basis of low power consumption, a single-bit ADC and oversampling may be used for receiving, a waveform may be an SC, and a mapping manner may use a super symbol codebook (SS-CB) received based on oversampling, or may use a time modulation waveform.

Because power consumption of the ADC increases exponentially with improvement of sampling precision of the ADC, it is difficult to implement a high-speed and high-precision ADC, including for an ultra-low power consumption device. The 802.11 ay/ad standard considers compatibility requirements for high-rate services and low power consumption services, uses an OFDM waveform and an SC waveform, and uses an LDPC code and an RS code for channel encoding. When a service requirement is a high rate, an OFDM waveform and an LDPC code are used to ensure high-rate transmission. When a service requirement is low power consumption, an SC waveform and an RS code are used to reduce demodulation and decoding power consumption. However, this standard still has a problem in supporting a low-precision ADC or even a single-bit ADC, and power consumption is still expected to be further reduced.

Figure 2:
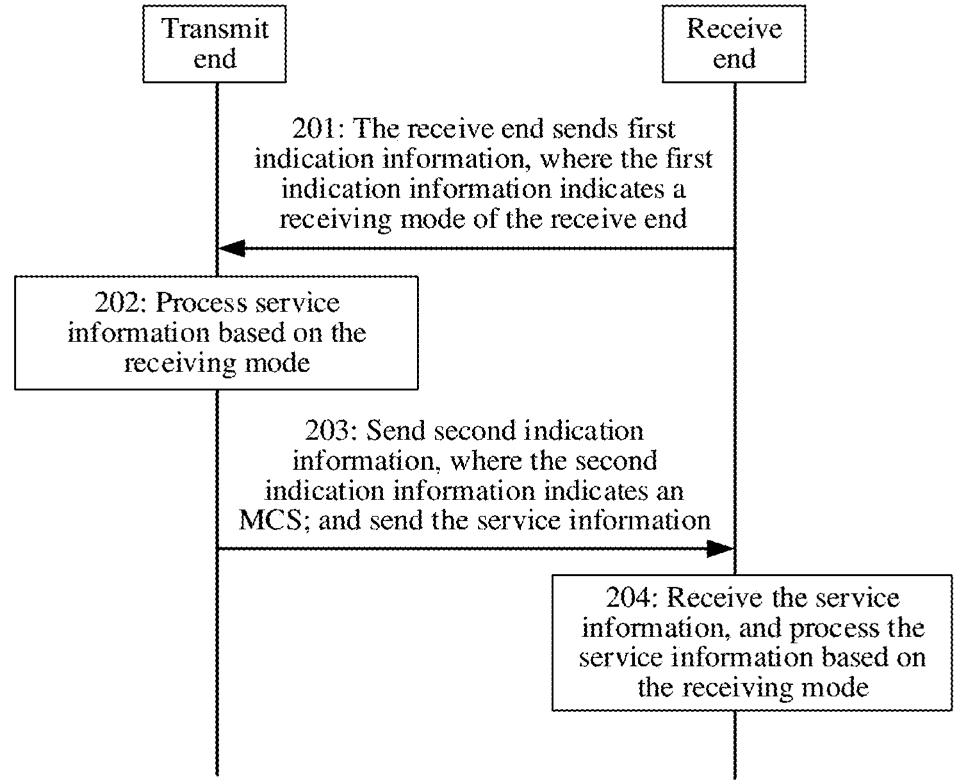
FIG. 2 is a schematic diagram of an information transmission procedure applicable to an embodiment.

To resolve the foregoing problem, the embodiments provide an information transmission method, as shown in FIG. 2.

201: A receive end sends first indication information to a transmit end, where the indication information indicates a receiving mode of the receive end.

202: The transmit end receives the indication information, and processes service information based on the receiving mode indicated by the indication information.

203: Send the service information, and send second indication information, where the second indication information indicates an MCS.

204: The receive end receives the second indication information, obtains the MCS, receives the service information, and processes the service information.

It should be understood that the receiving mode, of the receive end, that is indicated by the first indication information may be determined by the receive end from at least two receiving modes, or may be determined based on a service requirement of this time of information transmission.

It should be understood that the receiving mode may be indicated by the receive end to the transmit end by using the indication information, or may be indicated by the transmit end to the receive end by using the indication information. The transmit end indicates the receiving mode, and at least the receiving mode of the receive end and an identity ID of the receive end are in a maintenance list of the transmit end.

It should be understood that the transmit end may further determine a waveform, modulate the service information based on the waveform, and process the service information before sending the service information.

It should be further understood that the MCS may be determined based on the receiving mode indicated by the receive end, and the second indication information may be sent together with the service information, or may be separately sent. This is not limited.

The transmit end and the receive end may perform a receiving mode negotiation procedure during initial access.

For example, the transmit end is an AP, and the receive end is a terminal device. The terminal device may negotiate the receiving mode with the AP or another terminal device when accessing a network for the first time. A new device accessed to the network sends an identity (ID) and a receiving mode of the new device accessed to the network to the AP or the another terminal device. The AP or the another terminal device maintains an associated device list of the AP or the another terminal device, where the list includes a device ID and a receiving mode. The AP or the another terminal device may also send the ID and the receiving mode of the AP or the another terminal device to the new device accessed to the network, and the new device accessed to the network maintains an associated device list of the new device accessed to the network.

The transmit end and the receive end may perform the receiving mode negotiation procedure before service transmission.

If receiving mode negotiation is not performed when a new device accesses a network or one device is compatible with a plurality of receiving modes, receiving mode negotiation may alternatively be performed before transmission. If the transmit end initiates the receiving mode negotiation procedure, the transmit end may initiate a service sending request, and the receive end feeds back the receiving mode to the transmit end. If the receive end initiates the receiving mode negotiation procedure, the receive end sends the receiving mode to the transmit end when initiating a service request.

In the method, the receive end is compatible with a plurality of receiving modes. A receiving mode negotiation mechanism is established, so that the transmit end learns of the receiving mode of the receive end, and may determine the MCS or the like based on the receiving mode to perform information transmission. In this way, an appropriate or proper transmission scheme can be configured for service transmission, compatibility with a plurality of receiving modes can be supported, and service transmission flexibility can be improved.

It should be understood that compatibility with a plurality of receiving modes may mean that each device in a system supports a single receiving mode, but different devices support different receiving modes; or some devices in the system support a plurality of receiving modes, and other devices support one receiving mode; or all devices support a plurality of receiving modes. This is not limited.

Figure 3:
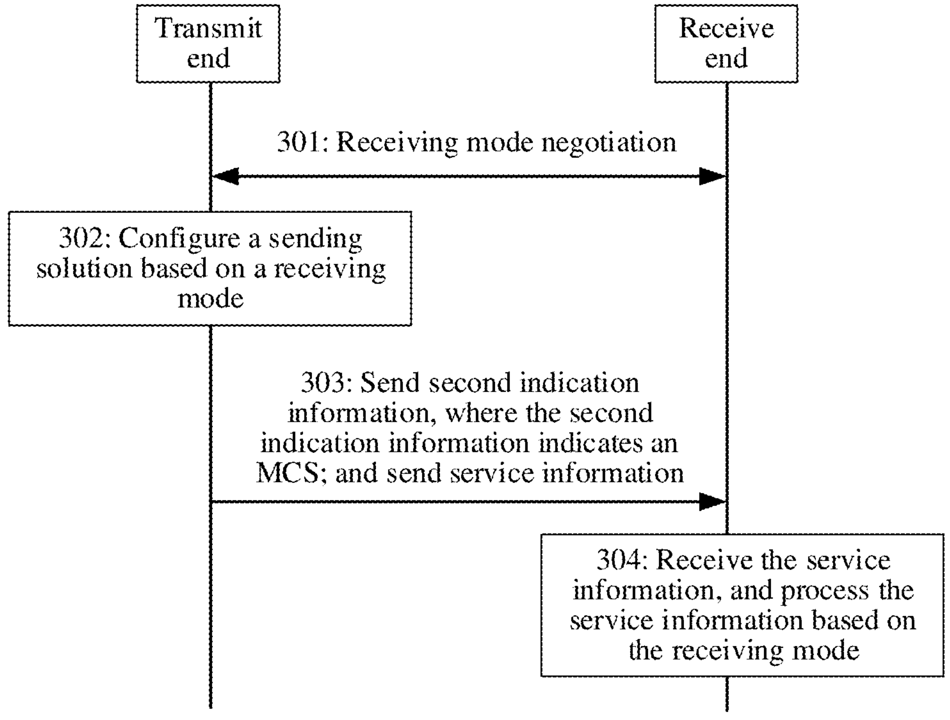
FIG. 3 is a schematic diagram of an information transmission procedure applicable to an embodiment.

An embodiment is as shown in FIG. 3.

301: A transmit end and a receive end perform receiving mode negotiation.

A negotiation manner is similar to the foregoing negotiation manner. Details are not described herein again.

302: The transmit end configures a sending solution based on a receiving mode of the receive end.

Figure 4:
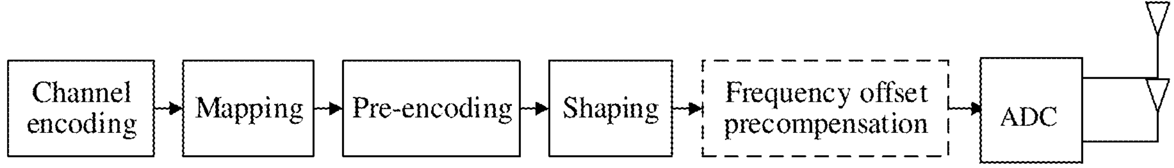
FIG. 4 is a schematic diagram of a service information processing procedure applicable to an embodiment.

For three receiving modes, a polar code is uniformly used for channel encoding, and a modulation scheme and a waveform are as described above. Processing on service information by the transmit end needs to include at least procedures of channel encoding, mapping, pre-encoding, shaping, and the like. A difference is that, when the receiving mode is Mode A (such as a first receiving mode), the transmit end does not need frequency offset precompensation; but when the receiving mode is Mode B or Mode C (such as a second receiving mode), the transmit end needs to enable a frequency offset precompensation module. A corresponding procedure is as shown in FIG. 4. Solutions of the transmit end in different modes are as described in Table 1.

TABLE 1

Correspondence between different modes and solutions of the transmit end

| Receiving mode | Solution of the transmit end | | | | | |
|---|---|---|---|---|---|---|
| | Channel encoding | Mapping | Pre-encoding | Waveform | Frequency offset precompensation | Multi-antenna |
| Mode A | Polar code | MPSK/MQAM | ✓ | OFDM/SC | × | ✓ |
| Mode B | Polar code | BPSK/QPSK | ✓ | SC | ✓ | ✓ |
| Mode C | Polar code | SS-CB | ✓ | SC | ✓ | ✓ |

It should be understood that Table 1 is merely an example rather than a limitation, and may be implemented by using some or all content in the table. Table 1 may be presented in a form of a part or an entirety.

303: The transmit end sends second indication information, where the second indication information indicates an MCS determined by the transmit end, and sends the service information.

304: The receive end receives the second indication information, learns of the MCS, receives the service information, and processes the service information based on the MCS.

When receiving modes of the receive end are different, receiving ADC precision and the receiving solution are also different, as shown in Table 2.

TABLE 2

Relationship between the receiving mode, the receiving ADC precision, and the receiving solution

| Receiving mode | Receiving ADC precision | Receiving solution |
|---|---|---|
| Mode A (high-throughput mode) | Multi-bit | Non-oversampling |
| Mode B (ultra-low power consumption mode) | Single-bit | Non-oversampling |
| Mode C (enhanced low power consumption mode) | Single-bit | Oversampling |

It should be understood that Table 2 is merely an example rather than a limitation, and may be implemented by using some or all content in the table. Table 2 may be presented in a form of a part or an entirety.

For a receiver (a computer, a high-definition television, and the like) that needs to support a high-throughput service, a multi-bit ADC is used for receiving, and includes a high-precision ADC (≥4 bits) and a low-precision ADC (2 to 3 bits), a used waveform is OFDM and an SC, and a mapping manner is MQAM or MPSK. For a receiver (a watch, a wireless headset, and the like) that needs to support ultra-low power consumption, a single-bit ADC and non-oversampling are used for receiving, a waveform is an SC, and a mapping manner is MPSK. For an enhanced low power consumption device (such as VR glasses and the like) that needs to support a high-throughput service on a basis of low power consumption, a single-bit ADC and oversampling are used for receiving, a waveform is an SC, and a mapping manner uses a super symbol codebook (SS-CB) received based on oversampling, or uses a time modulation waveform.

In addition, different receiving modes correspond to different service information processing procedures.

Figure 5:
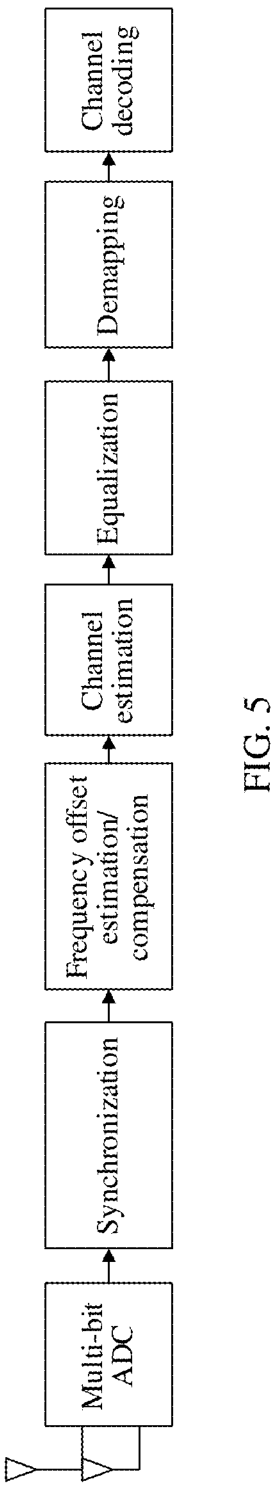
FIG. 5 is a schematic diagram of a service information processing procedure applicable to an embodiment.

When the receiving mode is Mode A, an information processing procedure and functional modules may be as shown in FIG. 5. The multi-bit ADC receives a signal, performs synchronization and frequency offset estimation/compensation, sends the signal to a channel estimation module for channel estimation and equalization, and then performs demapping and decoding on the signal.

Figure 6:
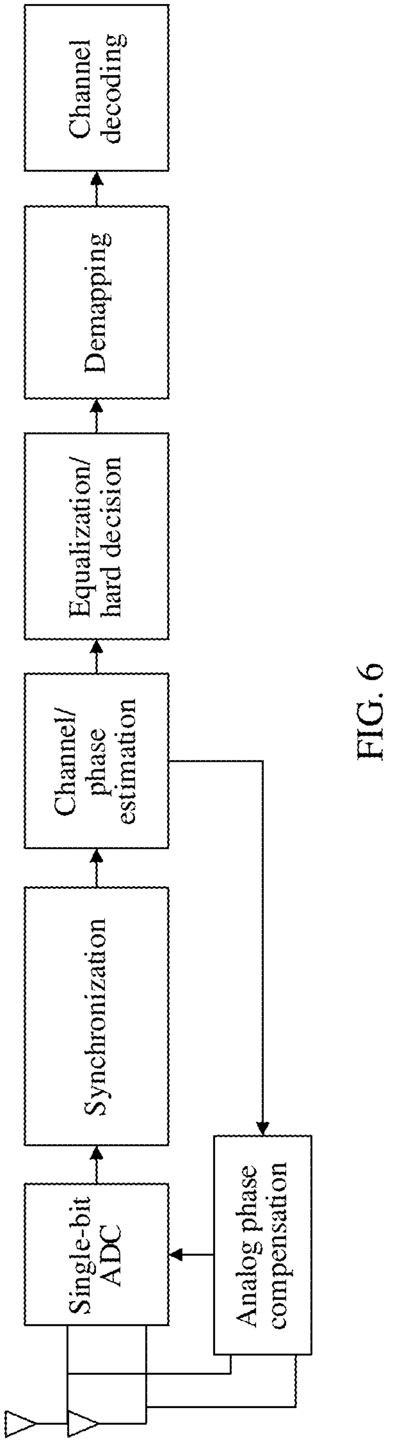
FIG. 6 is a schematic diagram of a service information processing procedure applicable to an embodiment.

When the receiving mode is Mode B, the information processing procedure and the functional modules may be as shown in FIG. 6. The single-bit ADC receives a signal. After performing synchronization, the receive end performs channel and/or phase estimation based on a pilot, feeds back a phase estimation result to an analog phase compensation module, and performs analog phase compensation on a service data signal before ADC quantization. After channel and/or phase estimation, equalization and/or hard decision are performed. If channel estimation is available, channel equalization and demapping may be performed, and soft information is sent to a decoder for decoding. Alternatively, after channel equalization is performed, hard decision may be performed, and then demapping is performed, to send hard bit information to a decoder for decoding. If no channel estimation is available, the information is sent to the decoder for decoding after soft/hard decision and demapping are performed.

Figure 7:
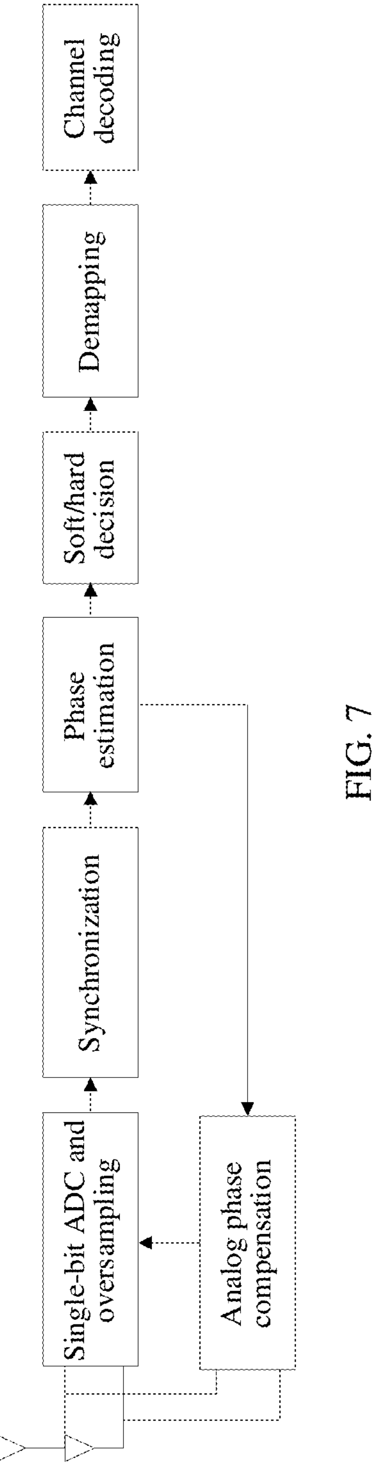
FIG. 7 is a schematic diagram of a service information processing procedure applicable to an embodiment.

When the receiving mode is Mode C, the information processing procedure and the functional modules may be as shown in FIG. 7. The single-bit ADC receives a signal through oversampling, and the transmit end uses the SS-CB codebook to cooperate with the receive end for oversampling processing. In compassion with Mode B, Mode C increases a system throughput. A difference from receiving processing of Mode B is that Mode C works on an approximate additive white Gaussian noise (AWGN) channel. Therefore, channel estimation may be omitted, only phase estimation and analog phase compensation are performed, and then soft/hard decision and demapping are performed, to send the information to the decoder for decoding.

In the embodiments, an indication of the receiving mode may be represented by using a 2-bit field. For example, 00, 01, and 10 may indicate Mode A, Mode B, and Mode C respectively.

It should be understood that the foregoing correspondence between a bit and a mode is merely an example rather than a limitation. For example, 00, 01, and 10 may indicate Mode B, Mode C, and Mode A respectively.

Figure 8:
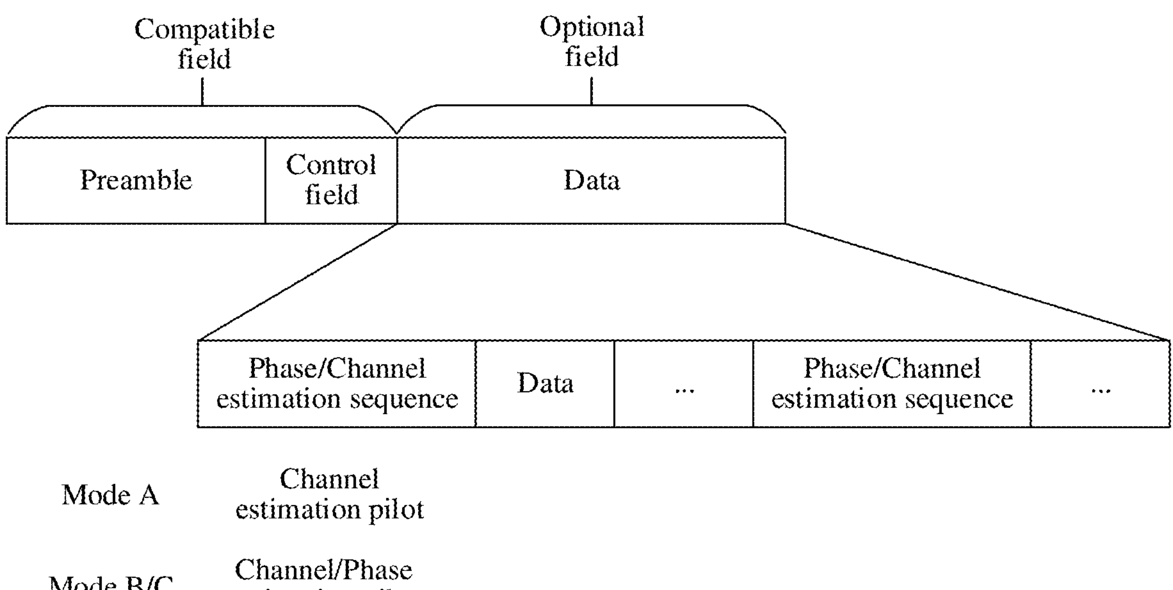
FIG. 8 is a schematic diagram of a structure of a data frame applicable to an embodiment.

A frame structure may be as shown in FIG. 8. A compatible field may be shared by all modes, and an optional field may be selected based on the mode. When the receiving mode is Mode A, a pilot sequence in the optional field uses a pilot used for channel estimation, such as a Golay sequence, a Zad-off Chu sequence, or the like. When the receiving mode is Mode B or Mode C, a pilot sequence in the optional field needs to support phase estimation in a single-bit ADC receiving procedure. Therefore, a pilot sequence phase needs to have a feature of being evenly distributed in $[-\pi, \pi]$, and may be obtained by multiplying the pilot sequence used for channel estimation by a known evenly distributed phase sequence.

An example of the MCS is as shown in Table 3. Each symbol in an SS-CB1 codebook may carry three bits, and efficiency is improved by 1.5 times compared with that in QPSK. The SS-CB1 codebook is $$\frac{1}{\sqrt{6}} \cdot [1+j, 3-j, 1-3j, 1-j, -1+3j, -1+j, -1-j, -3+j],$$

and eight symbols correspond to a binary bit sequence of decimal numbers 0 to 7 respectively, that is, (0, 0, 0) is mapped to $$\frac{1}{\sqrt{6}} \cdot (1+j).$$

It should be understood that the SS-CB 1 and an SS-CB 2 may alternatively be codebooks obtained through training in advance by using a machine learning method, so that demodulation performance and transmission efficiency can be further improved.

TABLE 3

| MCS table | | | | |
|---|---|---|---|---|
| MCS sequence number | Modulation | Bit/symbol | Code rate | Receiving mode |
| 0 | Reserved | | | |
| 1 | π/2-BPSK | 1 | 1/2 | Mode A/B |
| 2 | π/2-BPSK | 1 | 3/4 | Mode A/B |
| 3 | π/2-BPSK | 1 | 13/16 | Mode A/B |
| 4 | π/2-BPSK | 1 | 7/8 | Mode A/B |
| 5 | π/2-BPSK | 1 | 15/16 | Mode A/B |
| 6 | QPSK | 2 | 1/2 | Mode A/B |
| 7 | QPSK | 2 | 3/4 | Mode A/B |
| 8 | QPSK | 2 | 13/16 | Mode A/B |
| 9 | QPSK | 2 | 7/8 | Mode A/B |
| 10 | QPSK | 2 | 15/16 | Mode A |
| 11 | 16 QAM | 4 | 3/4 | Mode A |
| 12 | 16 QAM | 4 | 13/16 | Mode A |
| 13 | 16 QAM | 4 | 7/8 | Mode A |
| 14 | 16 QAM | 4 | 15/16 | Mode A |
| 15 | 64 QAM | 6 | 3/4 | Mode A |
| 16 | SS-CB 1 | 3 | 1/2 | Mode C |
| 17 | SS-CB 1 | 3 | 3/4 | Mode C |
| 18 | SS-CB 1 | 3 | 13/16 | Mode C |
| 19 | SS-CB 1 | 3 | 7/8 | Mode C |
| 20 | SS-CB 1 | 3 | 15/16 | Mode C |
| 21 | SS-CB 2 | 4 | 1/2 | Mode C |
| 22 | SS-CB 2 | 4 | 3/4 | Mode C |
| 23 | SS-CB 2 | 4 | 13/16 | Mode C |
| 24 | SS-CB 2 | 4 | 7/8 | Mode C |
| 25 | SS-CB 2 | 4 | 15/16 | Mode C |
| 26 to 31 | Reserved | | | |

It should be understood that Table 3 is merely an example rather than a limitation, and may be implemented by using some or all content in the table. Table 3 may be presented in a form of a part or an entirety.

It should be understood that the foregoing frame structure and the MCS table are applicable to embodiments.

It should be further understood that the foregoing information receiving and processing procedures corresponding to different modes may be performed in a separate procedure, that is, the receiver supports only one receiving mode. Different receiving modes can be compatible with each other on a same receiver.

Figure 9:
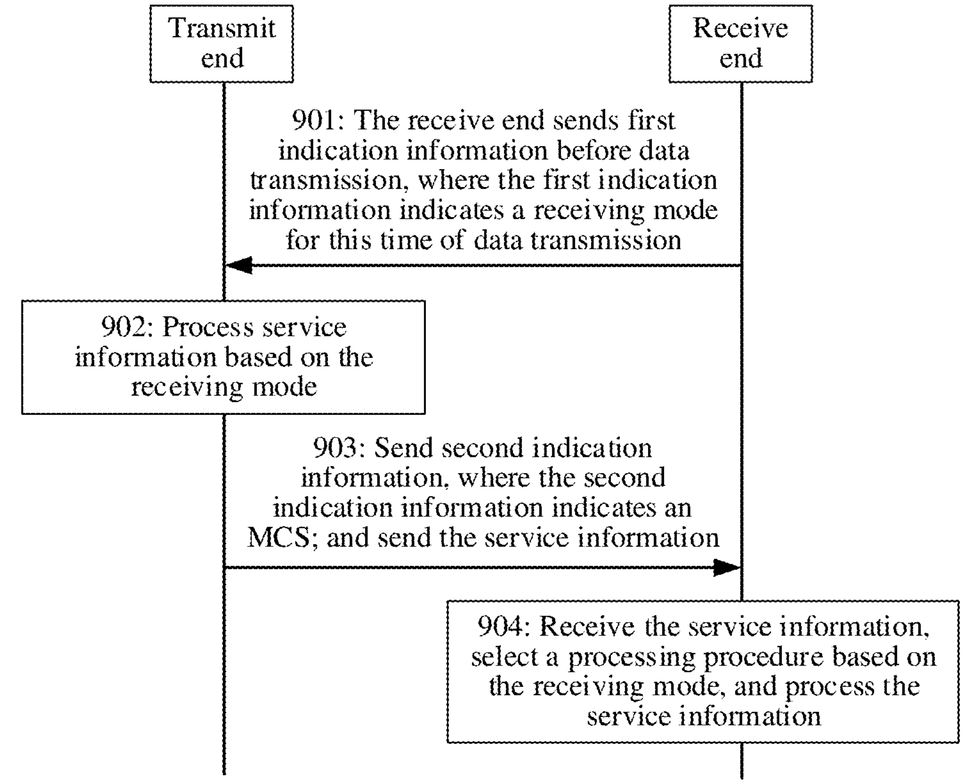
FIG. 9 is a schematic diagram of an information transmission procedure applicable to an embodiment.

Another embodiment is as shown in FIG. 9.

901: A receive end sends first indication information before data transmission, where the first indication information indicates a receiving mode for this time of data transmission.

It should be understood that the receiving mode for this time of data transmission may also be indicated by a transmit end to the receive end. This is not limited.

902: The transmit end determines an MCS based on the receiving mode for this time of data transmission, and processes service information.

903: Indicate the MCS to the receive end, and send the service information.

904: The receive end selects a corresponding processing procedure from at least two processing manners based on the receiving mode for this time of transmission, receives service information, and processes the service information.

It should be understood that a frame structure and the MCS for the data transmission are similar to those described above. Details are not described herein again.

Data processing procedures of a receiver compatible with different modes may be as shown in FIG. 10 to FIG. 13.

Figure 10:
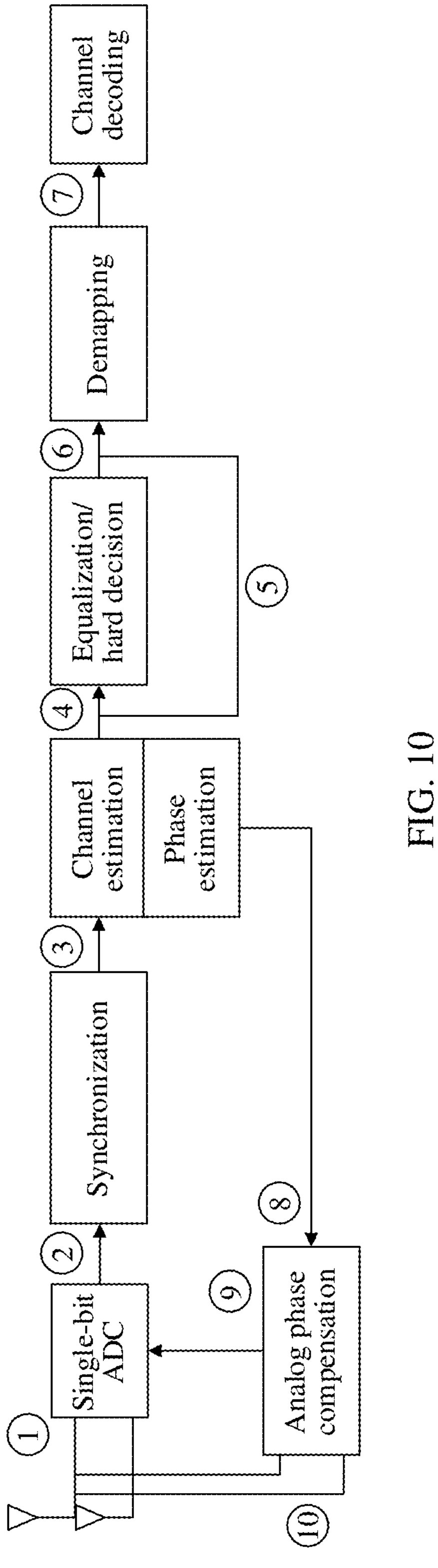
FIG. 10 is a schematic diagram of a service information processing procedure applicable to an embodiment.

FIG. 10 may be a working procedure of the receiver that supports a Mode B/C. When the receiver runs in Mode B, paths ①②③④⑤⑥⑦⑧⑨⑩ are enabled, and ⑤ is disabled, for example, an equalization/hard decision procedure needs to be performed in the Mode B. When the receiver runs in Mode C, paths ①②③④⑤⑥⑦⑧⑨⑩ are enabled, and ④ is disabled.

Figure 11:
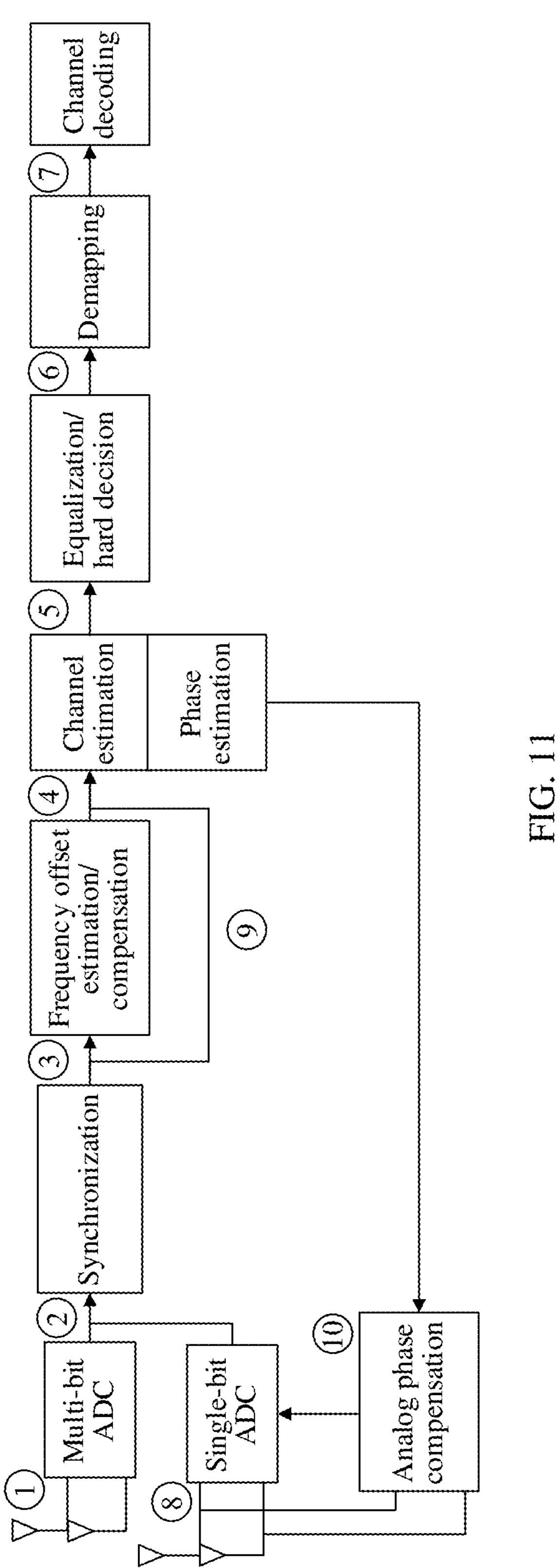
FIG. 11 is a schematic diagram of a service information processing procedure applicable to an embodiment.

FIG. 11 may be a working procedure of the receiver that supports a Mode A/B. When the receiver runs in Mode A, paths ①②③④⑤⑥⑦ are enabled, and ⑧⑨⑩ are disabled, for example, a multi-bit ADC receives a signal, and a frequency offset estimation/compensation procedure needs to be performed. When the receiver runs in Mode B, paths ②④⑤⑥⑦⑧⑨⑩ are enabled, and ① and ③ are disabled, for example, the Mode B may be that, based on a service requirement, a single-bit ADC receives a signal. When the single-bit ADC receives a signal, an analog phase compensation procedure needs to be performed. However, a frequency offset estimation/compensation procedure does not need to be performed in the Mode B.

Figure 12:
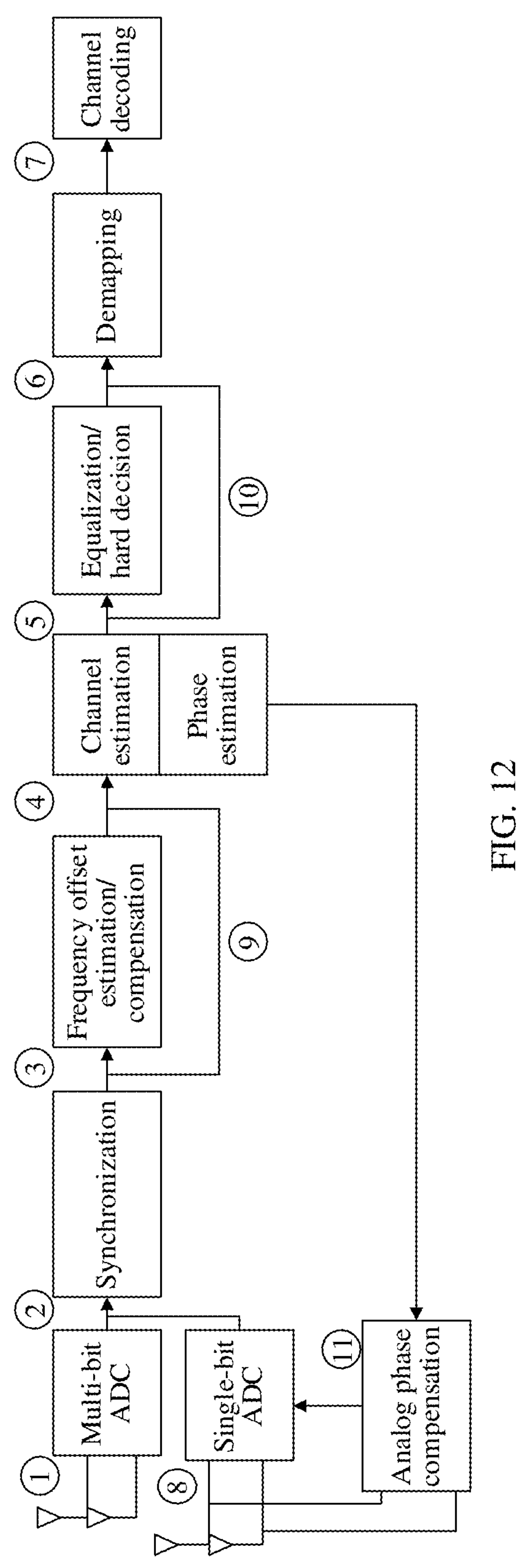
FIG. 12 is a schematic diagram of a service information processing procedure applicable to an embodiment.

FIG. 12 may be a working procedure of the receiver that supports a Mode A/C. When the receiver runs in Mode A, paths ①②③④⑤⑥⑦ are enabled, and ⑧⑨⑩⑪ are disabled, for example, a multi-bit ADC receives a signal, and a frequency offset estimation/compensation procedure needs to be performed. When the receiver runs in Mode C, paths ②③④⑤⑥⑦⑧⑨⑩⑪ are enabled, and ①③⑤ are disabled.

Figure 13:
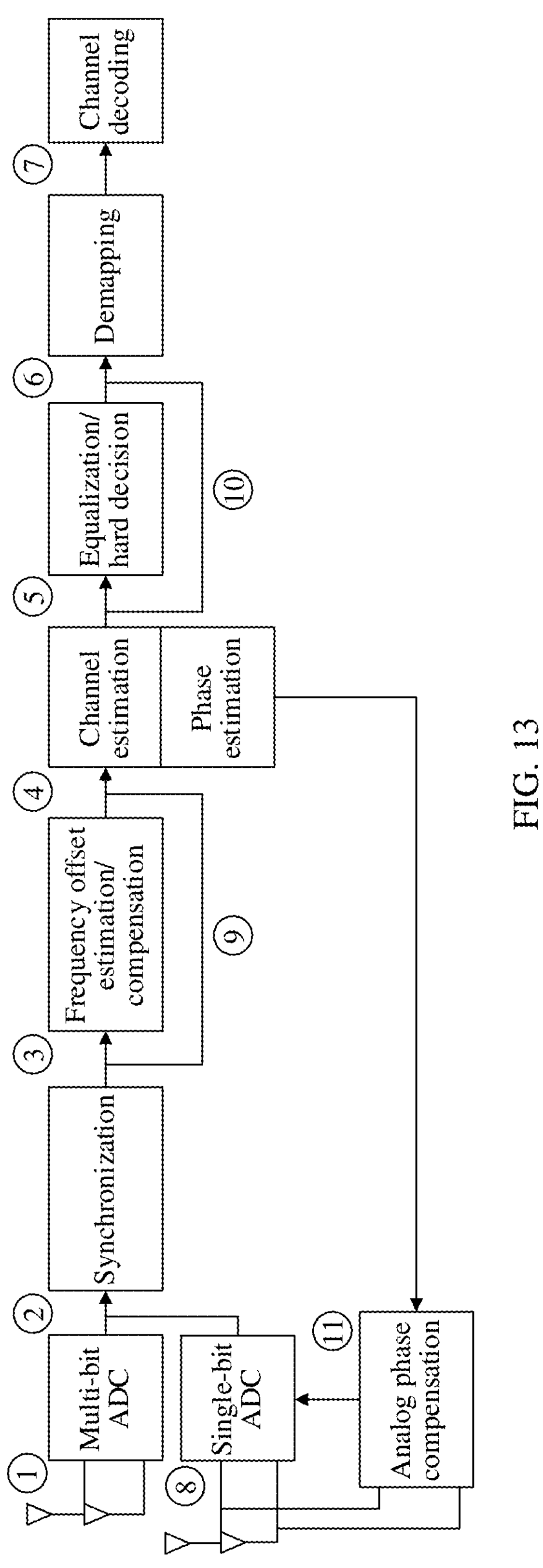
FIG. 13 is a schematic diagram of a service information processing procedure applicable to an embodiment.

FIG. 13 may be a working procedure of the receiver that supports a Mode A/B/C. When the receiver runs in Mode A, paths ①②③④⑤⑥⑦ are enabled, and ⑧⑨⑩⑪ are disabled. When the receiver runs in Mode B, paths ②③④⑤⑥⑦⑧⑨⑪ are enabled, and ①③⑩ are disabled. When the receiver runs in Mode C, paths ②③④⑤⑥⑦⑧⑨⑩⑪ are enabled, and ①③⑤ are disabled.

It should be understood that, in this embodiment, the receiving mode negotiation may be performed before each time of data transmission, or a negotiation procedure may be initiated when the receiving mode needs to be switched. This is not limited.

In this embodiment, the receiver supports a plurality of receiving modes, and the receiving mode may be dynamically adjusted between different times of data transmission based on the service requirement, and service data is received in a proper or appropriate receiving mode, so that information transmission flexibility is improved, and power consumption can be further reduced.

Figure 14:
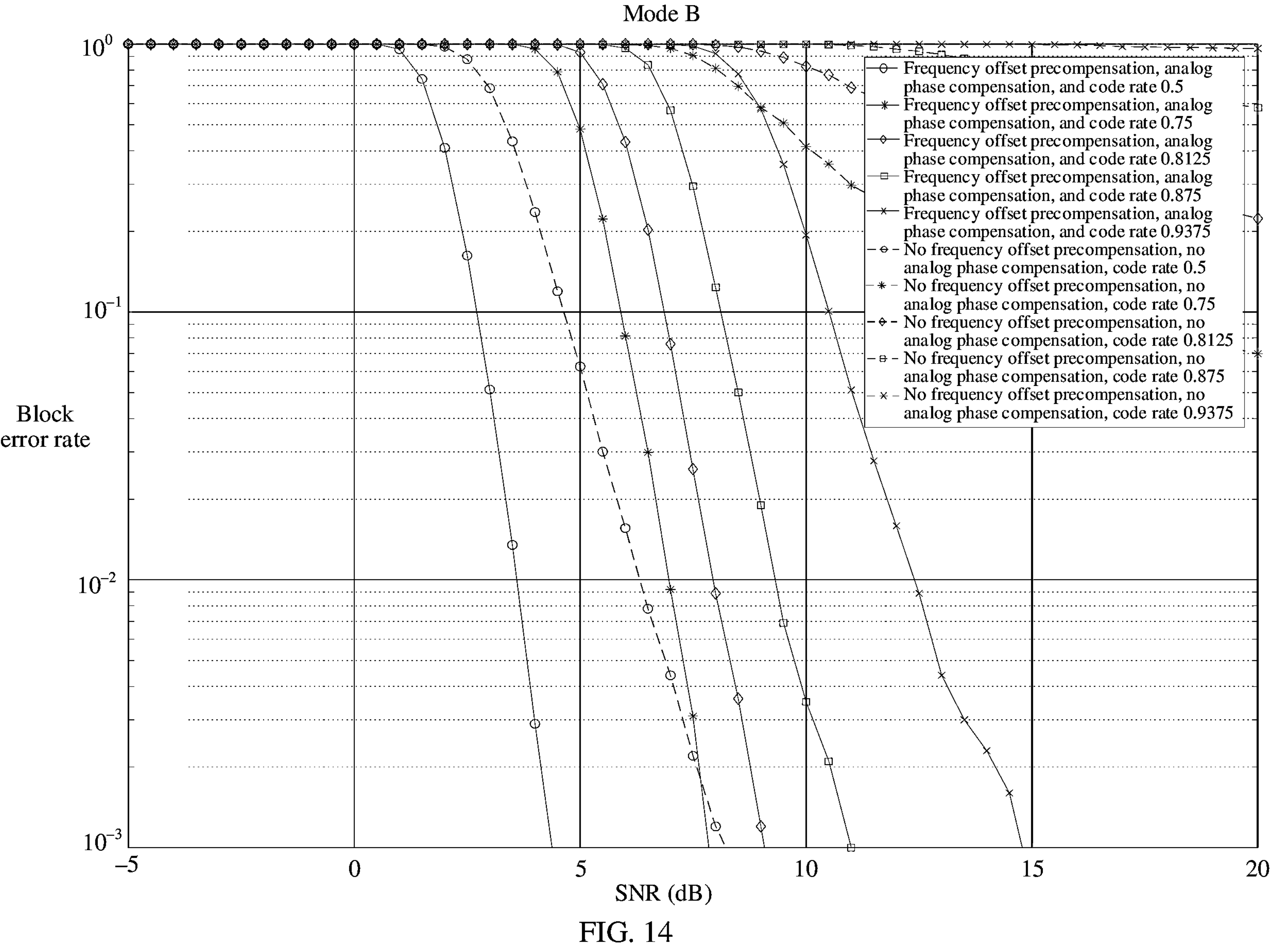
FIG. 14 is a schematic diagram of impact of whether there is frequency offset precompensation and analog phase compensation on block error rate performance according to an embodiment.

In an information receiving procedure corresponding to Mode B, impact of whether there is frequency offset precompensation and analog phase compensation on block error rate performance is as shown in FIG. 14. It may be understood that in a single-bit ADC receiving mode, system performance may be greatly improved by using frequency offset precompensation and analog phase compensation.

In the foregoing embodiments, the methods are separately described from a perspective of interaction between devices. To implement functions in the methods provided in the foregoing embodiments, the network device or the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the solutions.

In embodiments, division into modules is an example, and is merely a logical function division. During actual implementation, another division manner may be used. In addition, functional modules in embodiments may be integrated into one processor, or may exist alone physically, or two or more modules may be integrated into one module. The integrated module may be implemented in a form of hardware, or may be implemented in a form of a software functional module.

Figure 15:
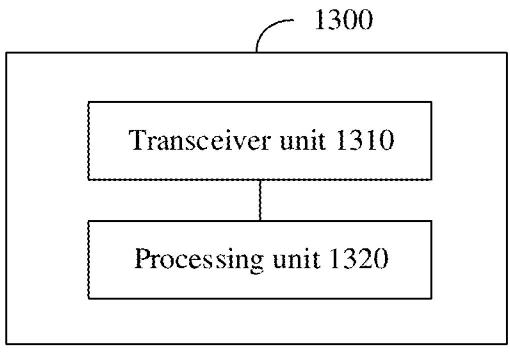
FIG. 15 is a schematic block diagram of a communication apparatus applicable to an embodiment.

Similar to the foregoing concept, as shown in FIG. 15, an embodiment further provides an apparatus 1300 configured to implement a function of the network device or the terminal device in the foregoing methods. For example, the apparatus may be a software module or a chip system. In this embodiment, the chip system may include a chip, or may include a chip and another discrete component. The apparatus 1300 may include a processing unit 1310 and a communication unit 1320.

In this embodiment, the communication unit may also be referred to as a transceiver unit, and may include a sending unit and/or a receiving unit, respectively configured to perform sending and receiving steps of the network device or the terminal device in the foregoing method embodiments.

Figure 16:
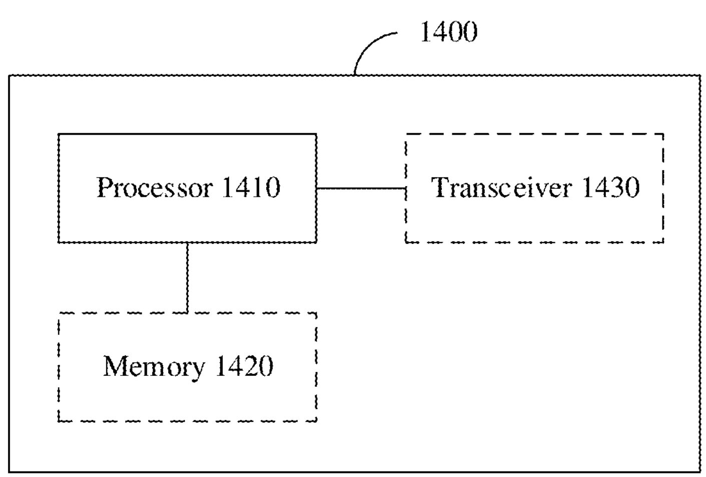
FIG. 16 is a schematic block diagram of a communication apparatus applicable to an embodiment.

The following describes in detail communication apparatuses provided in embodiments with reference to FIG. 15 and FIG. 16. It should be understood that descriptions of apparatus embodiments correspond to the descriptions of the method embodiments. Therefore, for content that is not described in detail, refer to the foregoing method embodiments. For brevity, details are not described herein again.

The communication unit may also be referred to as a transceiver, a transceiver machine, a transceiver apparatus, or the like. The processing unit may also be referred to as a processor, a processing board, a processing module, a processing apparatus, or the like. Optionally, a component that is in the communication unit 1320 and that is configured to implement a receiving function may be considered as a receiving unit, and a component that is in the communication unit 1320 and that is configured to implement a sending function may be considered as a sending unit. In other words, the communication unit 1320 includes the receiving unit and the sending unit. The communication unit sometimes may also be referred to as a transceiver machine, a transceiver, an interface circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

When the communication apparatus 1300 performs the function of the receive end in the procedure shown in any one of FIG. 2 to FIG. 14 in the foregoing embodiments, the processing unit is configured to process service information based on a receiving mode; and the communication unit is configured to send and receive the information.

When the communication apparatus 1300 performs the function of the transmit end in the procedure shown in any one of FIG. 2 to FIG. 14 in the foregoing embodiments, the processing unit is configured to process service information; and the communication unit is configured to send and receive the information.

The foregoing is merely an example. The processing unit 1310 and the communication unit 1320 may further perform other functions. For more detailed descriptions, refer to related descriptions in the method embodiments shown in FIG. 2 to FIG. 12 or other method embodiments. Details are not described herein again.

FIG. 16 shows an apparatus 1400 according to an embodiment. The apparatus shown in FIG. 16 may be an implementation of a hardware circuit of the apparatus shown in FIG. 15. The communication apparatus is applicable to the foregoing flowchart, and performs the function of the terminal device or the network device in the foregoing method embodiments. For ease of description, FIG. 16 shows only main components of the communication apparatus.

As shown in FIG. 16, the communication apparatus 1400 includes a processor 1410 and an interface circuit 1420. The processor 1410 and the interface circuit 1420 are coupled to each other. It may be understood that the interface circuit 1420 may be a transceiver or an input/output interface. Optionally, the communication apparatus 1400 may further include a memory 1430, configured to store instructions to be executed by the processor 1410, store input data required for running instructions by the processor 1410, or store data generated after the processor 1410 runs instructions.

When the communication apparatus 1400 is configured to implement the methods shown in FIG. 2 to FIG. 14, the processor 1410 is configured to implement the function of the processing unit 1310, and the interface circuit 1420 is configured to implement the function of the communication unit 1320.

When the communication apparatus is a chip applied to a terminal device, the chip in the terminal device implements the function of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip applied to a network device, the chip in the network device implements the function of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in embodiments may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or may be any conventional processor or the like.

In embodiments, the processor may be a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, the storage medium is coupled to the processor, so that the processor can read information from the storage medium and write information into the storage medium. Further, the storage medium may alternatively be a component of the processor. The processor and the storage medium may be disposed in an ASIC. In addition, the ASIC may be located in the network device or the terminal device. Additionally, the processor and the storage medium may alternatively exist as discrete components in the network device or the terminal device.

A person skilled in the art should understand that embodiments may be provided as a method, a system, or a computer program product. Therefore, the embodiments may use a form of hardware only embodiments, software only embodiments, or embodiments with a combination of software and hardware. Moreover, the embodiments may use a form of a computer program product that is implemented on one or more computer-usable storage media (including, but not limited to, a disk memory, an optical memory, and the like) that include computer-usable program code.

The embodiments are described with reference to the flowcharts and/or block diagrams of the method, the device (system), and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a non-transitory computer-readable memory that can instruct the computer or any other programmable data processing device to work in a specific manner, so that the instructions stored in the non-transitory computer-readable memory generate an artifact that includes an instruction apparatus. The instruction apparatus implements a specific function in one or more processes in the flowcharts and/or in one or more blocks in the block diagrams.

It is understood that a person skilled in the art may make various modifications and variations to the embodiments without departing from their scope. In this way, is the embodiments are intended to cover these modifications and variations of the embodiments provided that they fall within the scope of defined by the embodiments and their equivalent technologies.

The foregoing descriptions are merely implementations of the embodiments, but are not intended as limiting. Any variation or replacement readily figured out by a person skilled in the art within the scope described shall fall within the scope of the embodiments.

What is claimed is:

1. A method, comprising:

sending, by a receive end, first indication information that indicates a target receiving mode of the receive end, and the target receiving mode is one of a plurality of receiving modes;

receiving, by the receive end, service information based on the target receiving mode; and performing, by the receive end, decoding processing on the service information based on the target receiving mode, wherein the receiving, by the receive end, of service information based on the target receiving mode comprises:

the plurality of receiving modes comprise a first receiving mode and a second receiving mode, and when the target receiving mode is the first receiving mode, receiving, by the receive end, a first frame comprising a first field and a second field, the first field carries the service information, and the second field comprises a channel estimation pilot sequence; or when the target receiving mode is the second receiving mode, receiving, by the receive end, a second frame comprising a third field and a fourth field, the third field carries the service information, and the fourth field comprises a phase estimation pilot sequence.

2. The method according to claim 1, wherein the performing, by the receive end, of decoding processing on the service information based on the target receiving mode comprises:

receiving, by the receive end, second indication information that indicates a first modulation and coding scheme (MCS), and the first MCS is determined based on the target receiving mode; and performing, by the receive end, demodulation processing on the service information based on the first MCS.

3. The method according to claim 1, wherein the plurality of receiving modes comprise the first receiving mode and the second receiving mode, the first receiving mode is for receiving the service information through a multi-bit analog-to-digital converter (ADC), and the second receiving mode is for receiving the service information through a single-bit ADC.

4. The method according to claim 1, wherein the plurality of receiving modes comprise a third receiving mode, a fourth receiving mode, and a fifth receiving mode, decoding processing corresponding to the third receiving mode comprises frequency offset estimation/compensation and equalization, decoding processing corresponding to the fourth receiving mode comprises analog phase compensation and equalization/hard decision, and decoding processing corresponding to the fifth receiving mode comprises analog phase compensation.

5. The method according to claim 1, wherein the performing, by the receive end, of decoding processing on the service information based on the target receiving mode further comprises:

receiving, by the receive end, third indication information that indicates a first waveform, and the first waveform is determined based on the target receiving mode; and performing, by the receive end, demodulation processing on the service information based on the first waveform.

6. The method according to claim 1, wherein the decoding processing further comprises synchronization, channel estimation, and/or phase estimation, demapping, and channel decoding.

7. A method, comprising:

receiving, by a transmit end, first indication information that indicates a target receiving mode of a receive end, and the target receiving mode is one of a plurality of receiving modes;

performing, by the transmit end, encoding processing on service information based on the target receiving mode; and sending, by the transmit end, the service information, wherein the sending, by the transmit end, of the service information comprises:

the plurality of receiving modes comprise a first receiving mode and a second receiving mode, and when the target receiving mode is the first receiving mode, sending, by the transmit end, a first frame comprising a first field and a second field, the first field carries the service information, and the second field comprises a channel estimation pilot sequence; or when the target receiving mode is the second receiving mode, sending, by the transmit end, a second frame comprising a third field and a fourth field, the third field carries the service information, and the fourth field comprises a phase estimation pilot sequence.

8. The method according to claim 7, wherein the performing, by the transmit end, of encoding processing on service information based on the target receiving mode comprises:

performing, by the transmit end, encoding processing on the service information based on a first modulation and coding scheme (MCS), wherein the first MCS is determined based on the target receiving mode; and sending, by the transmit end, second indication information that indicates the first MCS.

9. The method according to claim 7, wherein the plurality of receiving modes comprise the first receiving mode and the second receiving mode, and encoding processing corresponding to the second receiving mode comprises frequency offset precompensation.

10. The method according to claim 7, wherein the performing, by the transmit end, of encoding processing on service information based on the target receiving mode comprises:

performing, by the transmit end, modulation and shaping processing on the service information in a first waveform based on the target receiving mode; and sending, by the transmit end, third indication information, wherein the third indication information indicates the first waveform.

11. The method according to claim 7, wherein the encoding processing further comprises channel encoding, mapping, and pre-encoding.

12. An apparatus, comprising a transceiver unit, at least one processor and at least one memory storing instructions that, when executed by the at least one processor, cause the apparatus to:

send first indication information, wherein the first indication information indicates a target receiving mode of a receive end, and the target receiving mode is one of a plurality of receiving modes;

receive, by the transceiver unit, service information based on the target receiving mode; and perform decoding processing on the service information based on the target receiving mode, wherein the receiving, by the transceiver unit, of the service information based on the target receiving mode comprises:

the plurality of receiving modes comprise a first receiving mode and a second receiving mode, and when the target receiving mode is the first receiving mode, receive, by the transceiver unit, a first frame, wherein the first frame comprises a first field and a second field, the first field carries the service information, and the second field comprises a channel estimation pilot sequence; or when the target receiving mode is the second receiving mode, receive, by the transceiver unit, a second frame, wherein the second frame comprises a third field and a fourth field, the third field carries the service information, and the fourth field comprises a phase estimation pilot sequence.

13. The apparatus according to claim 12, wherein the at least one processor is further configured to receive second indication information, wherein the second indication information indicates a first modulation and coding scheme (MCS), and the first MCS is determined based on the target receiving mode; and to perform demodulation processing on the service information based on the first MCS.

14. The apparatus according to claim 12, wherein the plurality of receiving modes comprise the first receiving mode and the second receiving mode, the first receiving mode is for receiving the service information through a multi-bit analog-to-digital converter (ADC), and the second receiving mode is for receiving the service information through a single-bit ADC.

15. The apparatus according to claim 12, wherein the plurality of receiving modes comprise a third receiving mode, a fourth receiving mode, and a fifth receiving mode, decoding processing corresponding to the third receiving mode comprises frequency offset estimation/compensation and equalization, decoding processing corresponding to the fourth receiving mode comprises analog phase compensation and equalization/hard decision, and decoding processing corresponding to the fifth receiving mode comprises analog phase compensation.

16. The apparatus according to claim 12, wherein the at least one processor is configured to receive third indication information, wherein the third indication information indicates a first waveform, and the first waveform is determined based on the target receiving mode; and to perform demodulation processing on the service information based on the first waveform.

17. The apparatus according to claim 12, wherein the at least one processor is configured to perform synchronization, channel estimation and/or phase estimation, demapping, and channel decoding.

* * * * *